US010356839B2

(12) United States Patent
Ang et al.

(10) Patent No.: US 10,356,839 B2
(45) Date of Patent: Jul. 16, 2019

(54) LOW POWER DISCONTINUOUS RECEPTION WITH A SECOND RECEIVER

(71) Applicant: QUALCOMM Incorporated, San Diego, CA (US)

(72) Inventors: Peter Pui Lok Ang, San Diego, CA (US); Tingfang Ji, San Diego, CA (US); Joseph Patrick Burke, Glenview, IL (US); Joseph Binamira Soriaga, San Diego, CA (US); Stephen Jay Shellhammer, Ramona, CA (US); Krishna Kiran Mukkavilli, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/815,520

(22) Filed: Jul. 31, 2015

(65) Prior Publication Data
US 2016/0128128 A1 May 5, 2016

Related U.S. Application Data

(60) Provisional application No. 62/077,058, filed on Nov. 7, 2014, provisional application No. 62/075,088, filed on Nov. 4, 2014.

(51) Int. Cl.
*H04W 4/00* (2018.01)
*H04W 76/28* (2018.01)
(Continued)

(52) U.S. Cl.
CPC ....... *H04W 76/28* (2018.02); *H04W 52/0212* (2013.01); *H04W 52/0222* (2013.01);
(Continued)

(58) Field of Classification Search
CPC .............. Y02B 60/50; H04W 52/0216; H04W 52/0229; H04W 76/048; H04W 52/0225
(Continued)

(56) References Cited

U.S. PATENT DOCUMENTS

| 8,626,110 B2 | 1/2014 | Cheng et al. |
| 2005/0190711 A1 | 9/2005 | Morimoto |

(Continued)

FOREIGN PATENT DOCUMENTS

| EP | 2696634 A2 | 2/2014 |
| JP | 2005244604 A | 9/2005 |
| WO | WO-2013106473 A1 | 7/2013 |

OTHER PUBLICATIONS

International Search Report and Written Opinion—PCT/US2015/053547—ISA/EPO—dated Dec. 8, 2015.
(Continued)

*Primary Examiner* — Atique Ahmed
(74) *Attorney, Agent, or Firm* — Qualcomm IP Dept.; James Hunt Yancey, Jr.

(57) ABSTRACT

Certain aspects of the present disclosure relate to techniques and apparatus for efficient support of connected discontinuous reception (C-DRX) by using a wireless device (e.g., a user equipment (UE)) with a second receiver. A wireless device with two receivers may place one receiver in a low power mode and take the receiver out of the low power mode in response to a signal received from a serving base station (BS) of the wireless device. A BS may direct a wireless device to enter a low power DRX (LP-DRX) mode or enhanced DRX mode having longer low power cycles than a non-enhanced DRX mode, and the wireless device may place a primary receiver in a low power mode in response to the directive from the BS. Other aspects, embodiments, and features are also claimed and disclosed.

21 Claims, 14 Drawing Sheets

(51) Int. Cl.
*H04W 52/02* (2009.01)
*H04W 88/06* (2009.01)
*H04W 76/16* (2018.01)

(52) U.S. Cl.
CPC ........ *H04W 52/0235* (2013.01); *H04W 76/16* (2018.02); *H04W 88/06* (2013.01); *Y02D 70/00* (2018.01); *Y02D 70/1242* (2018.01); *Y02D 70/1262* (2018.01); *Y02D 70/1264* (2018.01); *Y02D 70/23* (2018.01); *Y02D 70/24* (2018.01)

(58) Field of Classification Search
USPC .......................................................... 370/311
See application file for complete search history.

(56) References Cited

U.S. PATENT DOCUMENTS

| | | | |
|---|---|---|---|
| 2010/0184458 A1* | 7/2010 | Fodor | H04W 52/0216 455/522 |
| 2011/0211466 A1* | 9/2011 | Kazmi | H04W 52/0261 370/252 |
| 2011/0319072 A1* | 12/2011 | Ekici | H04W 48/18 455/426.1 |
| 2012/0064903 A1* | 3/2012 | Pani | H04W 36/0088 455/450 |
| 2012/0178485 A1* | 7/2012 | Zeira | H04W 4/08 455/515 |
| 2012/0257557 A1* | 10/2012 | Yamazaki | H04W 52/0229 370/311 |
| 2012/0289176 A1* | 11/2012 | Clevorn | H04W 88/06 455/131 |
| 2013/0017797 A1* | 1/2013 | Ramasamy | H04B 7/0814 455/226.1 |
| 2013/0039239 A1* | 2/2013 | Lin | H04W 52/0229 370/311 |
| 2013/0064151 A1 | 3/2013 | Mujtaba et al. | |
| 2013/0194994 A1* | 8/2013 | Dayal | H04W 72/1215 370/311 |
| 2013/0201890 A1* | 8/2013 | Swaminathan | H04W 88/06 370/311 |
| 2013/0201892 A1 | 8/2013 | Holma et al. | |
| 2013/0208831 A1 | 8/2013 | Oehler et al. | |
| 2013/0301420 A1* | 11/2013 | Zhang | H04W 76/048 370/241 |
| 2014/0050133 A1 | 2/2014 | Jafarian et al. | |
| 2014/0086209 A1* | 3/2014 | Su | H04W 76/026 370/331 |
| 2014/0112226 A1 | 4/2014 | Jafarian et al. | |
| 2014/0112229 A1 | 4/2014 | Merlin et al. | |
| 2014/0119410 A1 | 5/2014 | Tian et al. | |
| 2014/0126442 A1 | 5/2014 | Jafarian et al. | |
| 2014/0220926 A1 | 8/2014 | Shikama et al. | |
| 2014/0378172 A1* | 12/2014 | Lim | H04W 68/12 455/458 |
| 2015/0071179 A1* | 3/2015 | Zhang | H04W 52/04 370/329 |
| 2015/0105122 A1* | 4/2015 | Wei | H04W 24/04 455/553.1 |
| 2016/0007292 A1* | 1/2016 | Weng | H04W 52/0235 370/311 |

OTHER PUBLICATIONS

Abe T., et al., "An Ultra-Low-Power 2-Step Wake-Up Receiver for IEEE 802.15.4g Wireless Sensor Networks," Symposium on VLSI Circuits Digest of Technical Papers, 2014, pp. 1-2.

Kim S., "Low-Power Design of a Neuromorphic IC and MICS Transceiver," Dec. 2011, 96 Pages.

* cited by examiner

LOW POWER DISCONTINUOUS RECEPTION WITH A SECOND RECEIVER

CROSS-REFERENCE TO RELATED APPLICATIONS

The present Application for Patent claims priority to U.S. Provisional Application No. 62/075,088, filed Nov. 4, 2014, and U.S. Provisional Application No. 62/077,058, filed Nov. 7, 2014, both of which are assigned to the assignee of the present application and hereby expressly incorporated by reference herein in their entireties.

BACKGROUND

Field of the Disclosure

The present disclosure relates generally to wireless communication, and more particularly, to methods and apparatus for efficient support of discontinuous reception (DRX) by using a wireless device with a second receiver (or multiple receivers). As discussed below, certain embodiments can enable and provide power efficient wireless communication as well as aiding in enabling latency capable of supporting latency for critical applications for enhanced user experience.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. "LTE" refers generally to LTE and LTE-Advanced (LTE-A). Preferably, these improvements should be applicable to other multi-access technologies and the telecommunication standards that employ these technologies.

SUMMARY

Certain aspects of the present disclosure provide a method for wireless communications by a wireless device. The method generally includes placing a first receiver in a low power state when the wireless device is in an enhanced discontinuous reception (DRX) mode and monitoring with a second receiver, while the first receiver is in the low power state, for first signaling from a base station directing the wireless device to take the first receiver out of the low power state.

Certain aspects of the present disclosure provide a method for wireless communications by a wireless device. The method generally includes receiving first signaling directing the wireless device to begin a DRX OFF duration, placing a receiver in a low power state during the DRX OFF duration, and taking the receiver out of the low power state and exiting the DRX OFF duration in response to a triggering event.

Certain aspects of the present disclosure provide a method for wireless communications by a base station (BS). The method generally includes signaling a set of discontinuous reception (DRX) parameters to a wireless device, wherein the DRX parameters define a DRX ON duration during which a first receiver is active and a DRX OFF duration during which the first receiver is in a low power state and transmitting first signaling to the wireless device during a DRX OFF duration for detection by a second receiver, when the wireless device is in an enhanced DRX mode, the first signaling directing the wireless device to take the first receiver out of the low power state.

Certain aspects of the present disclosure provide a method for wireless communications by a base station (BS). The method generally includes signaling a set of discontinuous reception (DRX) parameters to a wireless device and transmitting first signaling directing the wireless device to begin a DRX OFF duration and place a receiver in a low power state during the DRX OFF duration.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
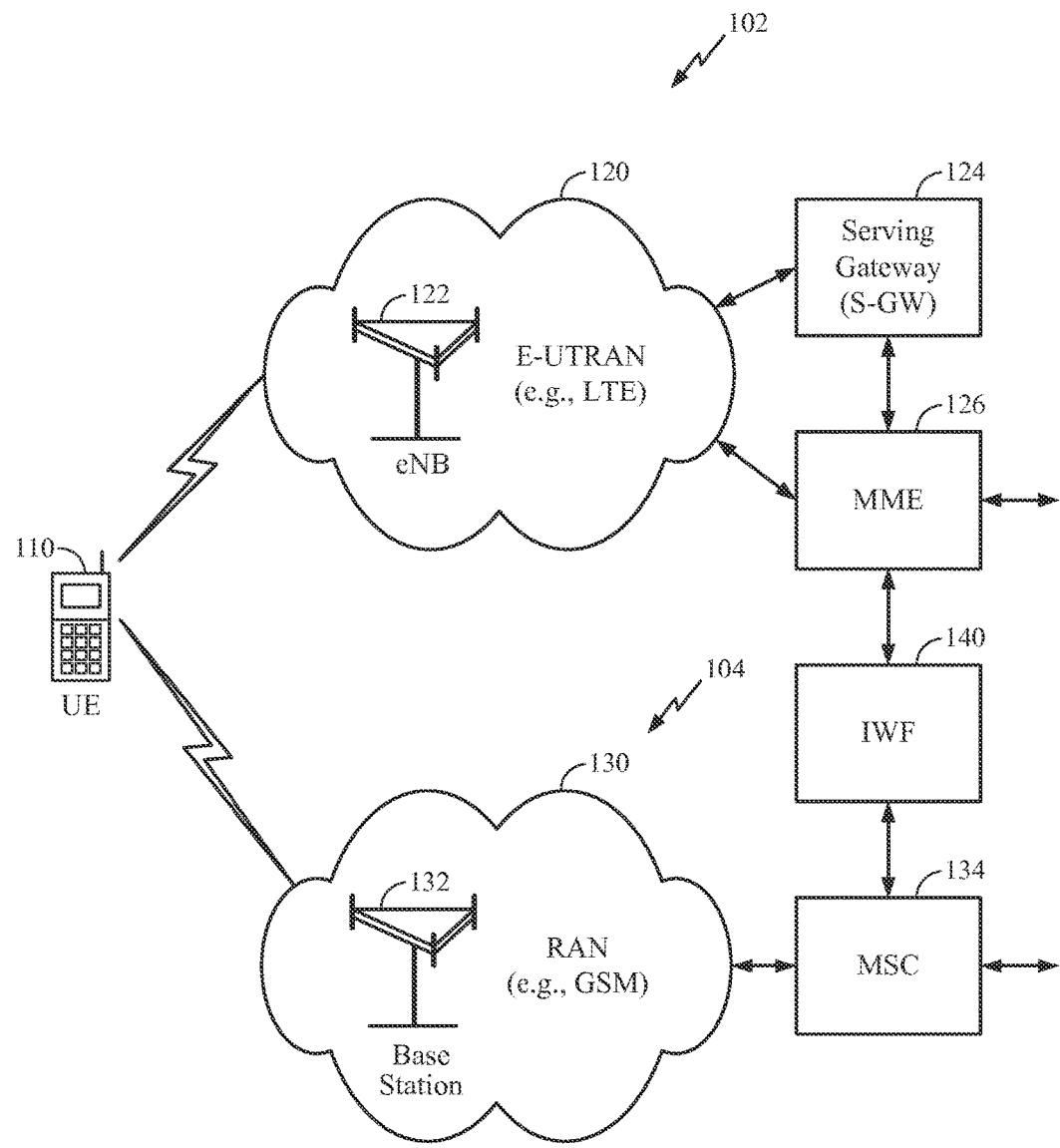
FIG. 1 illustrates an exemplary deployment in which multiple wireless networks have overlapping coverage, in accordance with certain aspects of the present disclosure.

Current (e.g., 4G) wireless systems may use a technique referred to as discontinuous reception (DRX) in order to improve battery life of UEs. In DRX, a UE periodically switches the UE's receiver on and off. The UE conserves power during the times UE's receiver is powered off. The UE switches the UE's receiver on and off on a cycle known to the UE's serving BS, and the BS transmits signals to the UE at times that the UE's receiver will be powered on. If the BS or UE has a need to communicate over an extended period of time, the DRX cycle may be interrupted and the UE's receiver activated for a long duration. When using DRX, length of a DRX cycle can be a significant contributor to overall system latency. That is, the time a BS waits for a UE's receiver to switch on as part of a DRX cycle for the UE may be a large fraction, or even a majority, of the time required for data to traverse the network from a source to the destination UE.

Future (e.g., 5G) wireless systems may require shorter latency, which will motivate network operators to use shorter DRX cycles in those wireless systems. However, the receiver in a UE operating with a short DRX cycle will be on (e.g., in DRX ON durations) more often and therefore will consume more power than it would with a longer DRX cycle, negatively impacting battery life of the UE. Regarding current and future wireless systems that can utilize embodiments of the present invention, sample scenarios discussed below may made be made with reference to currently existing systems (e.g., 2G/3G/4G) yet it should be stressed that these are done for discussions purposes. That is, embodiments of the present invention can be utilized in concert with many different types of communication networks, including for example 5G networks. In some circumstances, samples are given in a manner to enable the reader to appreciate one or more of the various features disclosed herein.

A UE operating under DRX may maintain one or more connections at upper (e.g., application, transmission control protocol (TCP), etc.) protocol layers when the UE switches off the UE's receiver. This mode of DRX operation may be referred to a connected discontinuous reception (C-DRX). According to aspects of the present disclosure, a UE may use a secondary receiver that has lower power consumption than a primary receiver of the UE to listen for control channels and other signals (e.g., data indicator) during ON durations of a C-DRX cycle. In an embodiment of the present disclosure, a UE may place a full-power (e.g., primary) receiver of the UE in a low power state (e.g., "deep sleep") during C-DRX operations and turn on a companion low-power low-complexity receiver to monitor for control channel, "wake-up," and other signals from a serving base station.

A UE that is camped on a cell without upper protocol layer connections may perform idle mode discontinuous reception (I-DRX). According to aspects of the present disclosure, a UE may use a secondary receiver that has lower power consumption than a primary receiver of the UE to listen for paging indicators and other signals during ON durations of an I-DRX cycle. In an embodiment of the present disclosure, a UE may place a full-power (e.g., primary) receiver of the UE in a low power state (e.g., "deep sleep") during I-DRX operations and turn on a companion low-power low-complexity receiver to monitor for paging indicators, "wake-up," and other signals from a serving base station.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, application specific integrated circuits (ASICs), gated/transistor/memristor logic, discrete hardware circuits, and other suitable hardware configured to perform the various functionality described throughout this disclosure. As those of skill in the art will appreciate, processors (or controllers) consist of internal architecture enabling processing of data so that input data is manipulated/transformed to produce output data for further processing. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 shows an exemplary deployment in which aspects of the present disclosure may be practiced. For example, UE 110 may have a primary receiver and a secondary receiver, may place the primary receiver in a low power state (e.g., powered-off or inactive) while operating in a DRX mode, and may use the secondary receiver to monitor for signaling indicating that the UE should take the primary receiver out of the low power state (e.g., by powering-up or activating the primary receiver). In a UE such as UE 110, the primary receiver may consume 100 mW or more of power while active, and when placed in a low power state, the primary receiver may consume 5-10 mW of power. According to aspects of the present disclosure, a secondary receiver monitoring for signaling may consume less than 1 mW of power. As a second example, eNB 122 or base station 132 may transmit a signal to UE 110 indicating that the UE should take a primary receiver of the UE out of a low power state.

An evolved universal terrestrial radio access network (E-UTRAN) 120 may support LTE and may include a number of evolved Node Bs (eNBs) 122 and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs.

A UE 110 may be stationary or mobile and may also be referred to as a mobile station, a terminal, an access terminal, a subscriber unit, a station, or generally a wireless device, etc. UE 110 may be a cellular phone, a personal digital assistant (PDA), a wireless modem, a wireless communication device, a handheld device, a laptop computer, a cordless phone, a wireless local loop (WLL) station, an entertainment device, a vehicular component, and many other types of devices configured for and capable of wireless communication.

Upon power up, UE 110 may search for wireless networks from which it can receive communication services. If more than one wireless network is detected, the UE may prioritize the detected networks based on which carrier provides each network and the radio access technology used by each network. For example, a user may pay carrier X for cell phone service, and the user's cell phone may be programmed to prefer carrier X networks above others. In the example, the cell phone may prefer LTE networks above GSM networks. Still in the example, the cell phone may assign a highest priority to carrier X's LTE networks, a second-highest priority to carrier X's non-LTE networks, a third-highest priority to LTE networks of other carriers, and a lowest priority to non-LTE networks of other carriers.

A UE 110 detecting more than one wireless network on power up may select a wireless network with the highest priority to serve UE 110. The selected network may be referred to as the serving network of UE 110. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have a priority between the priorities for frequency X and frequency Y. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
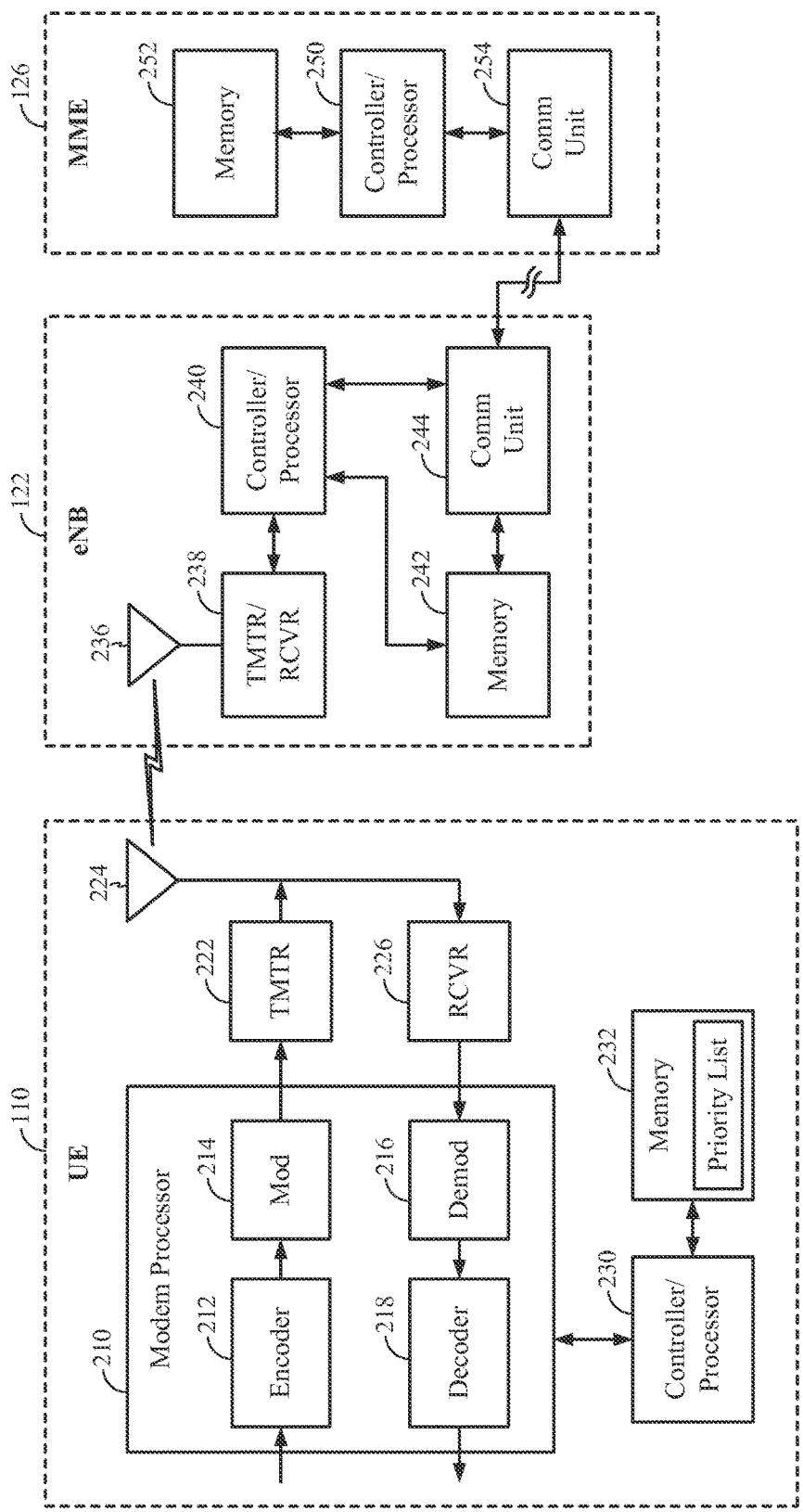
FIG. 2 illustrates a block diagram of a user equipment (UE) and other network entities, in accordance with certain aspects of the present disclosure.

FIG. 2 shows a block diagram of a design of UE 110, eNB 122, and MME 126 in FIG. 1. While aspects of the disclosure are described using LTE terminology and equipment used in LTE networks, the disclosure is not so limited and aspects of the disclosure are applicable to other network technologies. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may perform or direct the processing by UE 110 to perform operations 800, shown in FIG. 8, and operations 1000, shown in FIG. 10. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. Controller/processor 240 may perform or direct the processing by eNB 122 to perform operations 900, shown in FIG. 9, and operations 1100, shown in FIG. 11. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126. Memory 252 may store program codes and data for MME 126. A communication unit 254 may support communication with other network entities.

According to aspects, as will be described in more details herein, the UE 110 may support communications with multiple RATs (e.g., concurrent RATs) (CRAT). The CRAT UE may share uplink transmissions between two RATs, for example, in terms of TDM. The CRAT UE may support dual receiving of downlink transmissions. According to aspects, as will be described in more details herein, the UE 110 may be a single radio device. Such UE may support communications with multiple RATs.

FIG. 2 shows designs of UE 110, eNB 122, and MME 126. In general, each entity may include any number of transmitters, receivers, processors, controllers, memories, communication units, etc. Other network entities may also be implemented in similar manner.

For example, UE 110 of FIG. 2 comprises a single TMTR 222 and a single RCVR 226. According to aspects, UE 110 may comprise a single TMTR and a dual RCVR, and therefore may support CRAT. For example, UE 110 may share uplink transmissions between two RATs and may support dual downlink receiving. According to aspects, the UE may support CRAT with LTE and GMS or CDMA2000 1×RTT.

One challenge with utilizing a single transmitter for multiple RAT communications is that, at times, there may be conflicts between scheduled uplink transmissions in both RATs. While the conflict may occur with an uplink transmission, the uplink transmission itself may result from a scheduled downlink transmission. For example, for scheduled LTE downlink transmissions, a UE may need to transmit an ACK in uplink to confirm it received the data. In other words, it is possible that a UE may be scheduled for uplink transmission in both RATs during given a transmission period.

In some cases, Rx with multiple RATs (e.g., concurrent Rx) may also be achieved. For example, two Rx (e.g., two separate receive chains with two separate antennas) may be shared by GSM or CDMA2000 1×RTT, and LTE in a manner similar to Simultaneous Hybrid Dual Receivers (SHDR). When GSM or CDMA2000 1×RTT receiving is not needed, LTE may use two receive chains for multiple input multiple output (MIMO) and diversity. When GSM or CDMA2000 1×RTT receiving is needed, one Rx may be tuned to GSM or CDMA2000 1×RTT, and the remaining Rx may be used for LTE receiving. In some embodiments, since only one receive chain is being used for LTE, the UE may report a fake channel quality indicator (CQI) to avoid eNB scheduling for dual layer transmission.

Similarly, a challenge that exists with utilizing a single receiver for communications with multiple RATs is that, at times, there may be conflicts between scheduled downlink transmissions in both RATs. UE 110 shown in FIG. 2 comprises a single TMTR 222 and single RCVR 226, and therefore may only communicate with a single RAT at any given time, for example, LTE network 102 or GSM network 104 shown in FIG. 1.

In a single-radio device capable of communicating over multiple RATs (e.g., 1×RTT, GSM, and LTE), such as the UE 110, the device occasionally tunes its radio to each supported RAT and listens for communications (e.g., pages) from a BS of that RAT. To detect and receive a page or other communication, the device may tune its radio to a RAT for a period of time (e.g., 80 ms). The device may tune its radio to a particular RAT periodically, with the period (e.g., 1.28 sec, 2.56 sec, etc.) configurable by the network via RRC signaling, for example.

Figure 3:
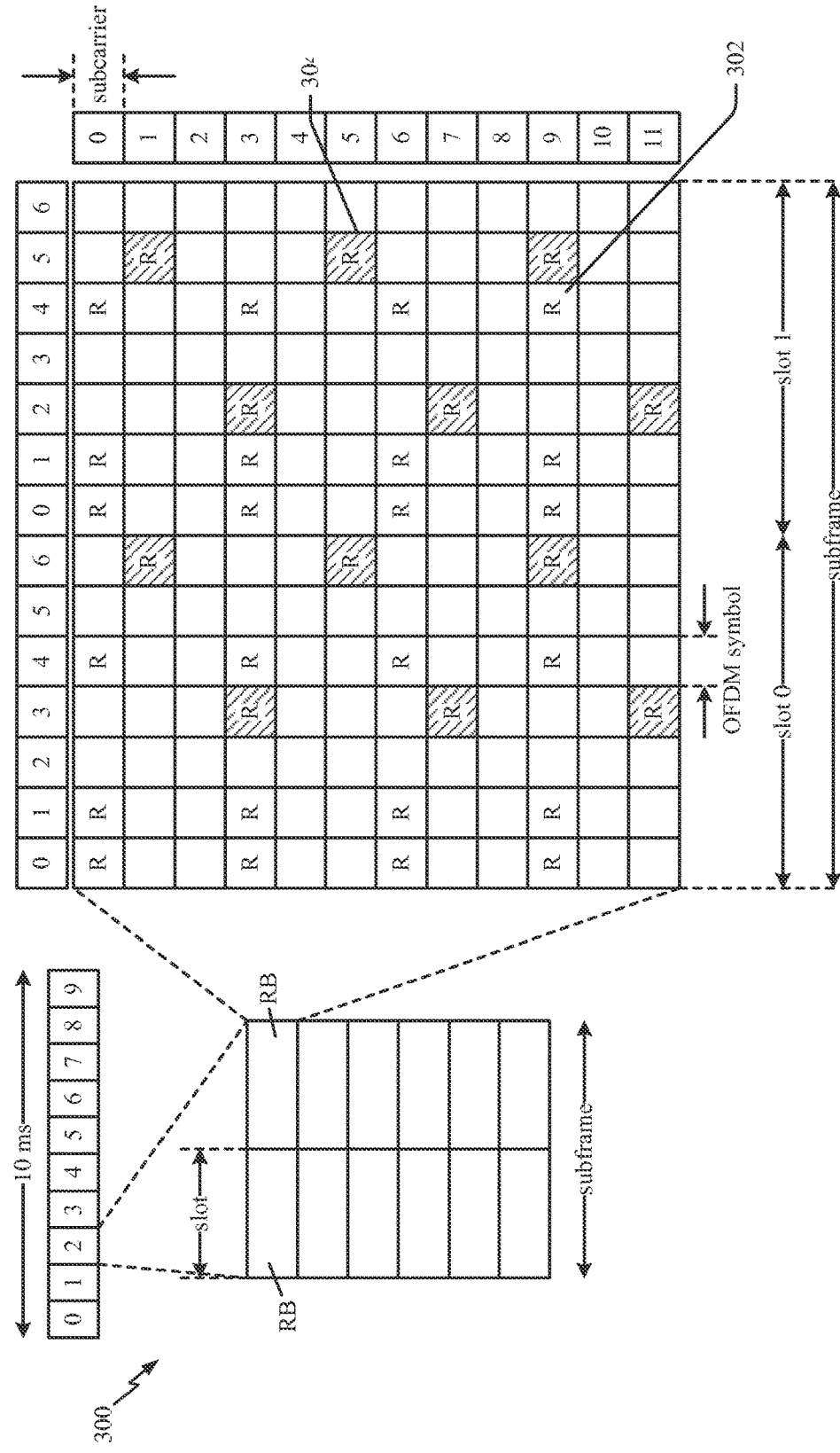
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
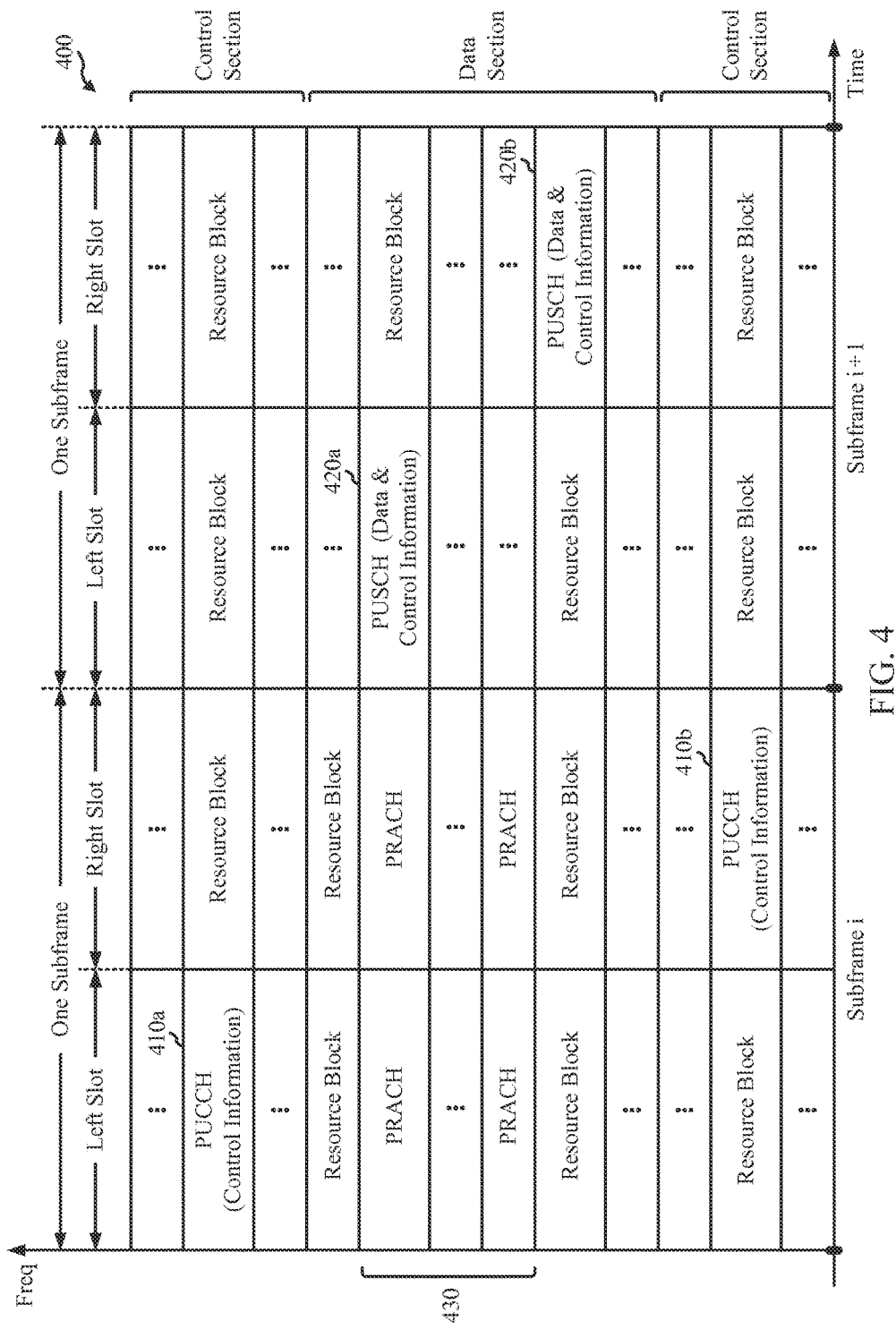
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
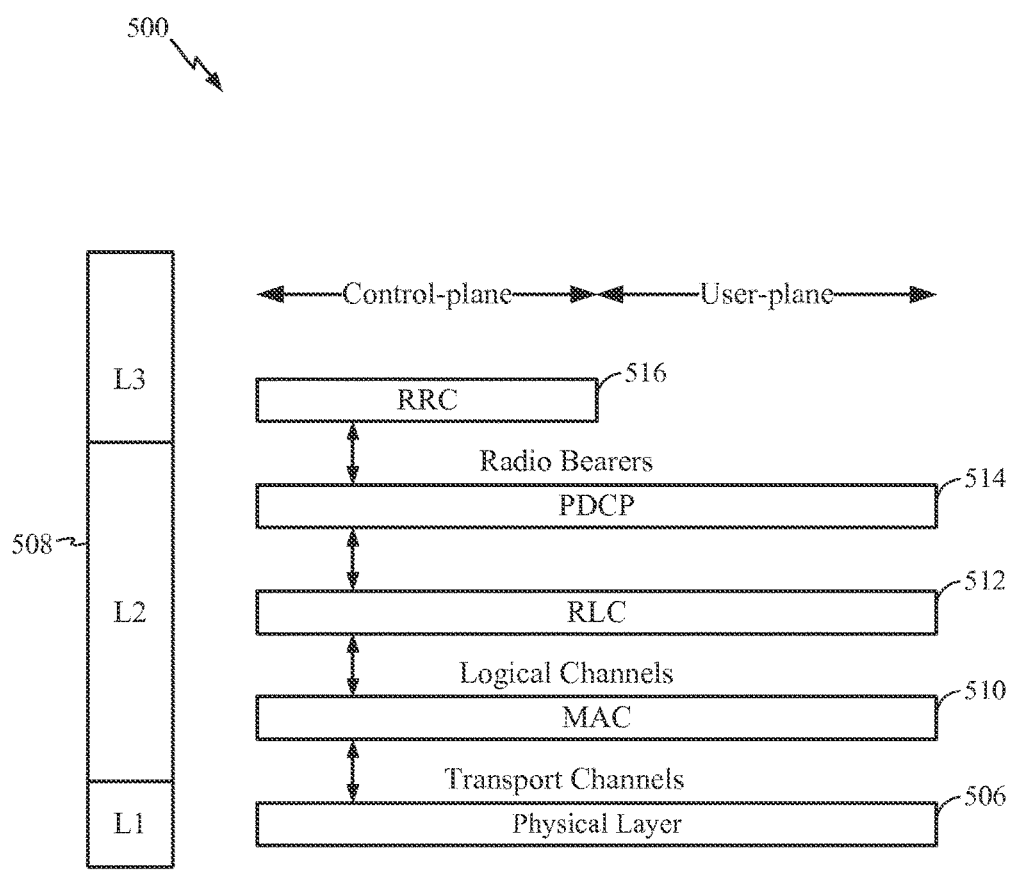
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
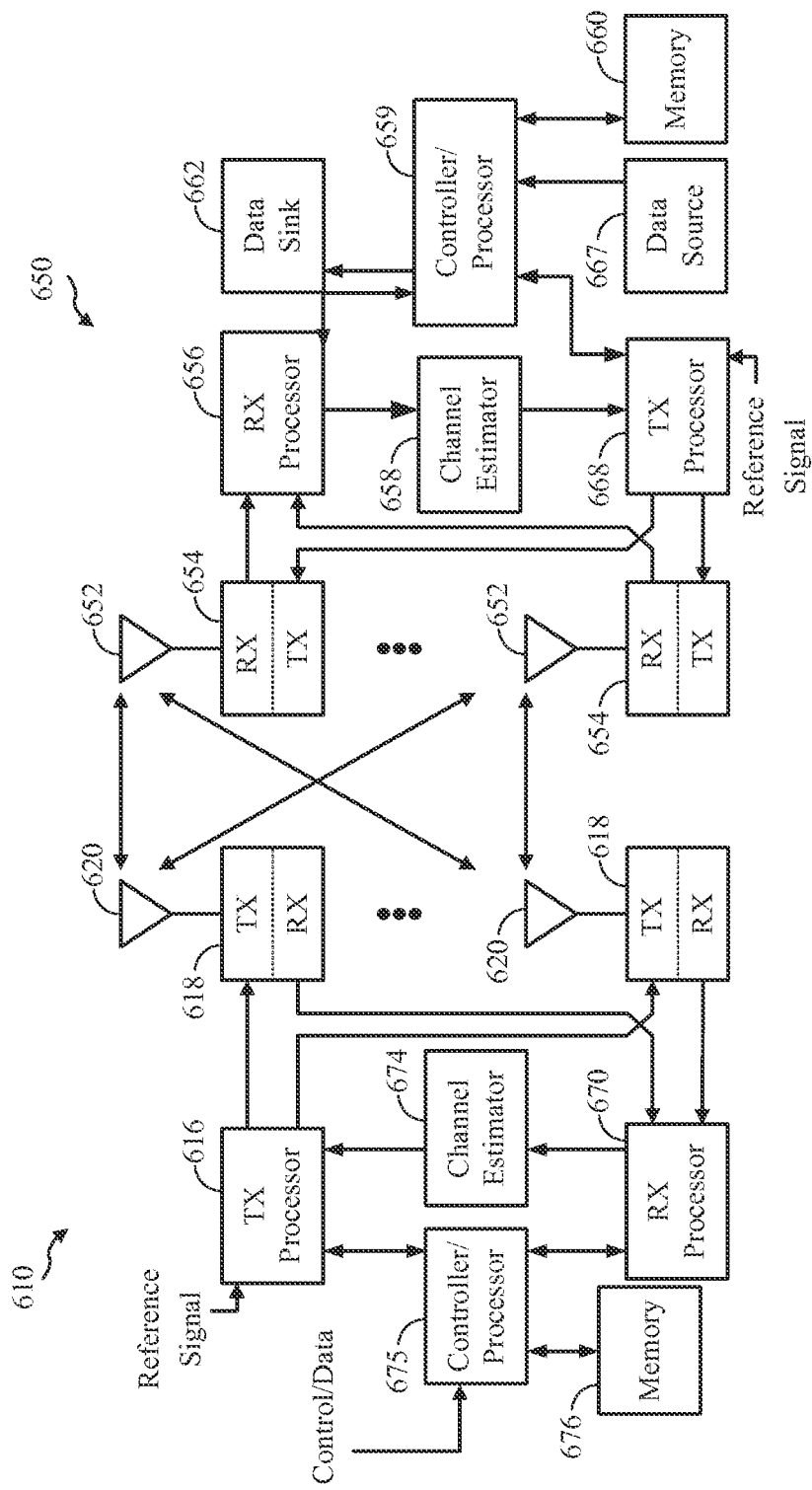
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 800 in FIG. 8, and/or other processes for the techniques described herein, for example. The controller/processor 675 and/or other processors and modules at the eNB 610 may perform or direct operations and/or other processes for the techniques described herein, for example. In aspects, one or more of any of the components shown in FIG. 6 may be employed to perform example operations 800 and/or other processes for the techniques described herein.

Example C-DRX Mode Operations

With the ever-increasing popularity of smart phones, there are many new challenges for the design of wireless systems, including power consumption and signaling demands. For example, instead of being awake only for the typically small percentage of talk time, smart phones are awake much more often. Applications, such as e-mail or social networking, may send "keep-alive" message every 20 to 30 minutes, for example. Such applications often use many small and bursty data transmissions that may entail a significantly larger amount of control signaling. Some system level evaluations have identified control channel limitations in addition to traffic channel limitations.

Connected Discontinuous Reception (C-DRX) generally refers to a technique used in wireless communication to reduce power consumption, thereby conserving the battery of the mobile device. The mobile device and the network negotiate phases in which data transfer occurs, where a receiver of the mobile device is turned on (e.g., in a connected state), referred to as an ON duration of the C-DRX cycle. During other times, referred to as OFF durations, the mobile device turns its receiver off and enters a low power state. There is usually a function designed into the protocol for this purpose. For example, the transmission may be structured in slots with headers containing address details so that devices may listen to these headers in each slot to decide whether the transmission is relevant to the devices or not. In this case, the receiver may only be active at the beginning of each slot to receive the header, conserving battery life. Other DRX techniques include polling, whereby the device is placed into standby for a given amount of time and then a beacon is sent by the base station periodically to indicate if there is any data waiting for it.

In LTE, C-DRX is typically controlled (configured) via radio resource control (RRC) signaling. For example, RRC signaling may set a cycle where a receiver of the UE is operational for a certain period, typically when all the scheduling and paging information is transmitted. When the UE is first entering C-DRX operations, the UE may start an inactivity timer for a configured period of time. The UE keeps its receiver turned on while the inactivity timer is running, and if the UE receives any signaling during this time, the UE will reset the inactivity timer to the configured time period and keep its receiver on. The serving evolved Node B (eNB) may know that the receiver of the UE is completely turned off and is not able to receive anything. Except when in C-DRX, the receiver of the UE may most likely be active to monitor a Physical Downlink Control CHannel (PDCCH) to identify downlink data. During C-DRX, the receiver of the UE may be turned off. In LTE, C-DRX may also apply to the RRC_Idle state with a longer cycle time than active mode.

There are generally two RRC states for a UE: (1) RRC_Idle where the radio is not active, but an identifier (ID) is assigned to the UE and tracked by the network; and (2) RRC_Connected with active radio operation having context in the eNB.

Example Methods and Apparatus for Low Power Discontinuous Reception with a Second Receiver In current (e.g., 4G) wireless systems, the length of a C-DRX cycle can be a significant contributor to overall system latency. Future (e.g., 5G) wireless systems may require shorter latency, which will motivate network operators to use shorter C-DRX cycles in those wireless systems. However, the receiver in a UE operating with a short C-DRX cycle will be on (e.g., in C-DRX ON durations) more often and therefore will consume more power than it would with a longer C-DRX cycle, negatively impacting battery life of the UE.

According to aspects of the present disclosure, a UE may use a secondary receiver that has lower power consumption than a primary receiver of the UE to listen for control channels and other signals (e.g., data indicator) during ON durations of a C-DRX cycle. In an embodiment of the present disclosure, a UE may place the full-power (e.g., primary) receiver of the UE in a low power state (e.g., "deep sleep") during C-DRX operations and turn on a companion low-power low-complexity receiver to monitor for control channels, "wake-up", and other signals from a serving base station.

According to aspects of the present disclosure, a UE may use a secondary receiver that has low power consumption. For example, the secondary receiver's power consumption can be 1 mW or less while active, which is significantly lower than a primary receiver's power consumption of 100 mW or more while active. According to aspects of the present disclosure, a UE may use a secondary receiver that has low power consumption (e.g., less than 1 mW) to listen for paging indicators and other signals during ON durations of an idle mode discontinuous reception (I-DRX) cycle. In an embodiment of the present disclosure, a UE may place a full-power (e.g., primary) receiver of the UE in a low power state (e.g., "deep sleep") during I-DRX operations, wherein the full-power receiver consumes less than 100 mW (for example, 10 mW) of power, and turn on a companion low-power low-complexity receiver to monitor for paging indicators, "wake-up," and other signals from a serving base station.

According to aspects of the present disclosure, a UE operating with a secondary receiver turned on and a primary receiver in a low power state may monitor for a signal (e.g., paging or "wake-up") from a serving eNB and, upon detecting the signal, activate the primary receiver to receive signaling (e.g., data or control signaling) from the eNB. According to certain aspects, the signal could be based on a waveform that could be demodulated by the primary receiver (e.g., OFDM). In certain aspects of the present disclosure, the signal could be based on a dedicated waveform that only the secondary receiver is designed to demodulate (e.g., on-off keying, amplitude-shift keying (ASK), frequency-shift keying (FSK)).

According to certain aspects of the present disclosure, a super-regenerative receiver may be used as secondary receiver in a UE. A super-regenerative receiver may be capable of non-coherent detection of an on-off keying waveform. Alternatively, other types (e.g., low intermediate-frequency (low-IF)) of non-coherent, energy-detection-based receivers capable of demodulating correspondingly suitable waveforms at very low power levels could be used. For example, an energy-detection-based receiver may consume 1 mW or less of power while monitoring for a signal to the UE indicating the UE should activate a primary receiver.

According to certain aspects of the present disclosure, a UE with multiple receivers capable of supporting multiple radio access technologies (RATs) may use a receiver of one RAT to monitor for signaling (e.g., paging or "wake-up") indicating the UE should activate a receiver of a second RAT. The UE may use a lower-power receiver or a receiver for a lower-power RAT to monitor for signaling indicating the UE should activate a receiver or receivers of one or more other RATs.

According to aspects of the present disclosure, a UE with multiple receivers may use a receiver to monitor for signaling (e.g., paging or "wake-up") on a first frequency band (e.g., a sub-1 GHz frequency band) indicating the UE should activate another receiver to receive on a second frequency band (e.g., a 3.5. GHz frequency band). The UE may use a lower-power (e.g., consuming 1 mW or less) receiver to monitor one frequency band for signaling (e.g., from a BS) indicating the UE should activate a primary receiver of the UE on another frequency band. Additionally or alternatively, a UE with multiple receivers may monitor a first carrier within a frequency band for signaling indicating the UE should activate another receiver to receive on a second carrier within the frequency band. In a cell operating with carrier aggregation (CA), the UE may activate a primary receiver to receive on multiple carrier frequencies in response to signaling on one carrier frequency detected by a secondary (e.g., low power) receiver of the UE.

According to certain aspects of the present disclosure, a base station may signal a UE with a secondary receiver to enter an enhanced or low power DRX (LP-DRX) mode, as an alternative or addition to schemes wherein the UE waits for an inactivity timer to expire, as in current wireless systems (e.g., LTE C-DRX). An enhanced DRX mode may comprise operating a UE with longer sleep (e.g., low power or deactivated) cycles (e.g., 5.12 seconds) optimized for delay-tolerant device-terminated applications than are used in DRX current (e.g., LTE Rel-8) wireless technologies. For example, a UE using current wireless technologies may be configured with sleep cycles of 2.56 seconds, while a UE using enhanced DRX may be configured with sleep cycles of 10.24 seconds. When the UE receives the signal to enter the low power DRX mode, the UE puts its primary receiver into a low power state and monitors for signals using the secondary receiver.

According to certain aspects of the present disclosure, a UE operating in an ON duration of a C-DRX cycle could be signaled by a serving base station to place a primary receiver of the UE in a low power state upon receipt of the signal, as an alternative or addition to schemes wherein the UE waits for the entire ON duration before putting the primary receiver in the low power state, as in current (e.g., 4G LTE) wireless systems.

According to certain aspects of the present disclosure, a UE with a secondary receiver operating in an idle mode DRX (I-DRX) cycle could activate the secondary receiver to monitor for page indicators during ON durations of the I-DRX cycle, leaving a primary receiver of the UE in a low power state until a page indicator is detected by the secondary receiver. In an aspect of the present disclosure, the primary receiver could be activated by the UE to decode the actual page message in response the secondary receiver detecting the page indicator.

A UE with two receivers operating according to aspects of the present disclosure may operate with a lower average latency than a UE operating in C-DRX mode with current (e.g., 4G LTE) wireless systems. For example, a UE operating in C-DRX mode with current wireless systems with a DRX cycle length of 40 msec has an average latency of 20 msec. In the example, a UE with two receivers may configure the secondary receiver, which consumes less than 10% (e.g., 1 mW) of the power consumed by the primary receiver (e.g., 250 mW), to be active once per 10 msec. Still in the example, the UE with two receivers has an average latency of 5 msec, which is a lower average latency than the latency of the UE operating with current wireless systems, but consumes less power than the UE operating with current wireless systems. A UE operating according to aspects of the present disclosure that is not receiving data may also consume less power than a UE operating in C-DRX mode with current (e.g., 4G LTE) wireless systems that is not receiving data. Continuing the example above, the UE operating with current wireless systems consumes 250 mW of power for one msec out of every 40 msec (i.e., the DRX cycle length), while the UE operating with two receivers according to aspects of the present disclosure consumes 1 mW of power for four msec out of every 40 msec. A UE operating according to aspects of the present disclosure that is receiving data may use slightly more (e.g., less than 1% more) power than a UE operating in C-DRX mode with current (e.g., 4G LTE) wireless systems that is receiving data, because for the former both the primary and secondary receivers are activated. Thus, a UE operating according to aspects of the present disclosure may operate with both lower latency and lower overall power consumption than a UE operating in C-DRX mode with current (e.g., 4G LTE) wireless systems.

Figure 7:
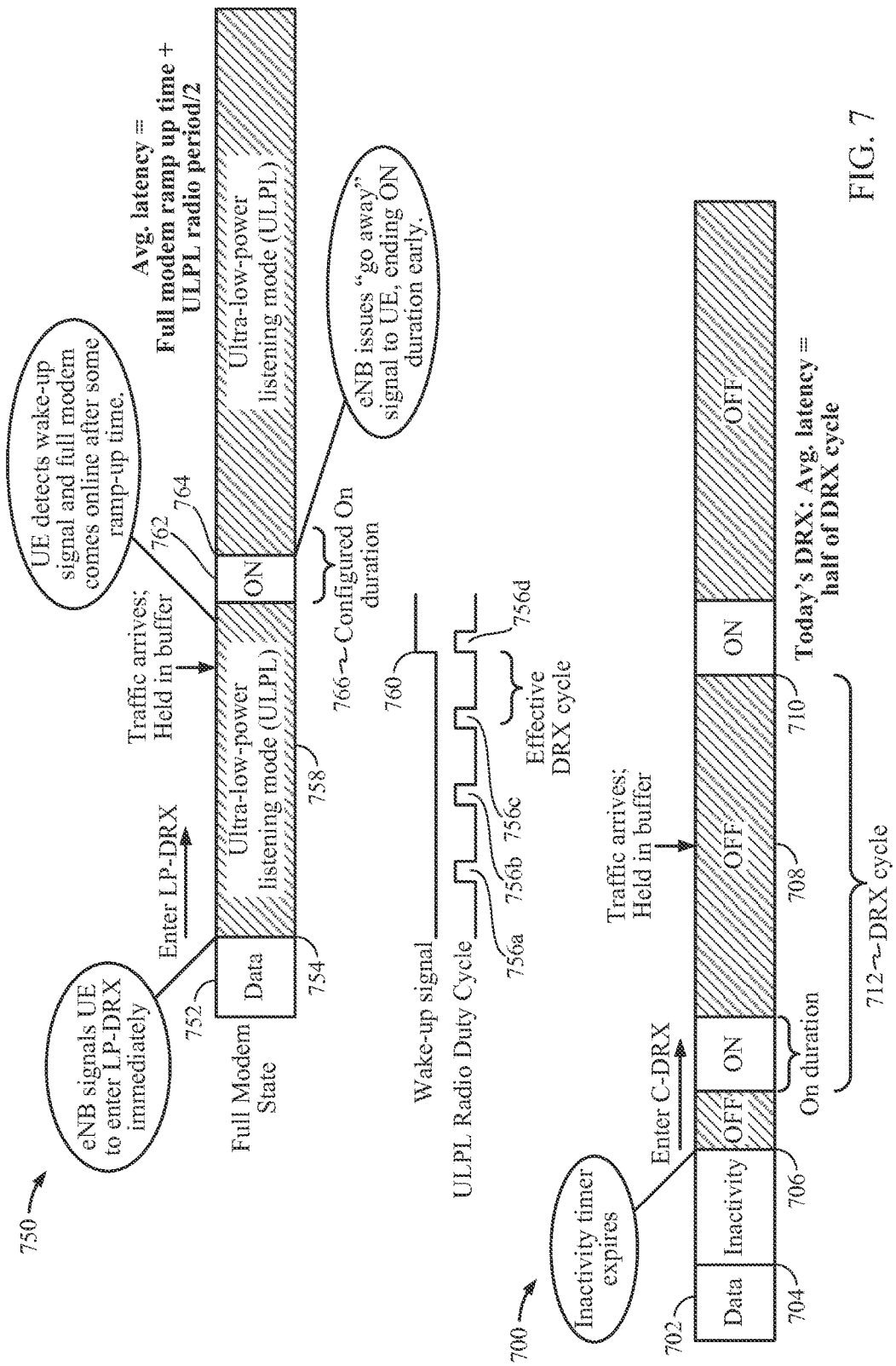
FIG. 7 illustrates exemplary timelines of UEs operating using discontinuous reception, in accordance with aspects of the present disclosure.

FIG. 7 illustrates an exemplary timeline 700 for a UE operating using C-DRX in current (e.g., 4G LTE or "Today's DRX") wireless communication systems and exemplary timeline 750 for a UE with a secondary receiver operating according to aspects of the present disclosure. In exemplary timeline 700, a UE receives data at time 702 and starts an inactivity timer when the data transmission ceases at 704. At 706, the inactivity timer expires, and the UE places its receiver in a low power ("OFF") state. At 708, data for the UE arrives at the serving base station of the UE and is held in a buffer until the next ON duration for the UE, which occurs at 710. Average latency for transmissions to a UE operating in C-DRX mode according to current (e.g., 4G LTE or "Today's DRX") wireless communication systems may be approximately half of the length of a DRX cycle, which consists of one ON duration and one OFF duration, as shown at 712.

In exemplary timeline 750, a UE receives data from a serving base station (e.g., an eNB) at time 752, and the serving base station of the UE signals the UE to enter an enhanced DRX or low power DRX (LP-DRX) mode when the base station is done transmitting data to the UE at 754. The UE enters the LP-DRX or ultra-low-power listening mode (ULPL) when it receives the command from the base station at 754. The UE operates a secondary receiver in a duty cycle, activating the secondary receiver to monitor for a signal (e.g., a control channel or "wake-up" signal) from the base station at each of times 756a-756d. The time period between the start of each ON duration in the duty cycle of the secondary receiver may be referred to as a ULPL radio period or Effective DRX cycle.

At 758, data for the UE arrives at the serving base station, which transmits a "wake-up" signal, illustrated at 760. The serving BS may be aware of the duty cycle of the secondary receiver of the UE, and may delay transmission of the "wake-up" signal until the next ON duration of the secondary receiver duty cycle, shown at 756d in the exemplary timeline. The UE detects the "wake-up" signal when the secondary receiver of the UE is active at 756d, and starts activation of the primary receiver or full modem of the UE. If the "wake-up" signal is transmitted before the end of the DRX OFF duration, the UE may end the DRX OFF duration (e.g., transition to a DRX ON duration) early (e.g., before expiration of a DRX OFF duration timer). The primary receiver of the UE is fully active ("ON") at 762, and the serving base station transmits the data to the UE. The serving base station has information (e.g., from a capabilities message previously received from the UE) regarding the time required for the primary receiver of the UE to be fully active, and delays for at least that period of time after transmitting the "wake-up" signal before attempting transmission of the data to the UE.

When the serving base station or eNB is done transmitting the data at 764, it transmits a signal (e.g., a "go away" signal) directing the UE to place its primary receiver back in the low power state. When the UE receives the signal directing the UE to place its primary receiver back in the low power state at 764, the UE places the primary receiver back in the low power state, transitioning back to the ULPL mode. The UE may place the primary receiver back into the low power state before the end of the configured ON duration 766 of the DRX mode. Average latency for transmissions to a UE with a secondary receiver operating according to the disclosed techniques may be approximately equal to half of the ULPL radio period plus power up (e.g., "ramp up") time of the primary receiver or full modem.

Figure 8:
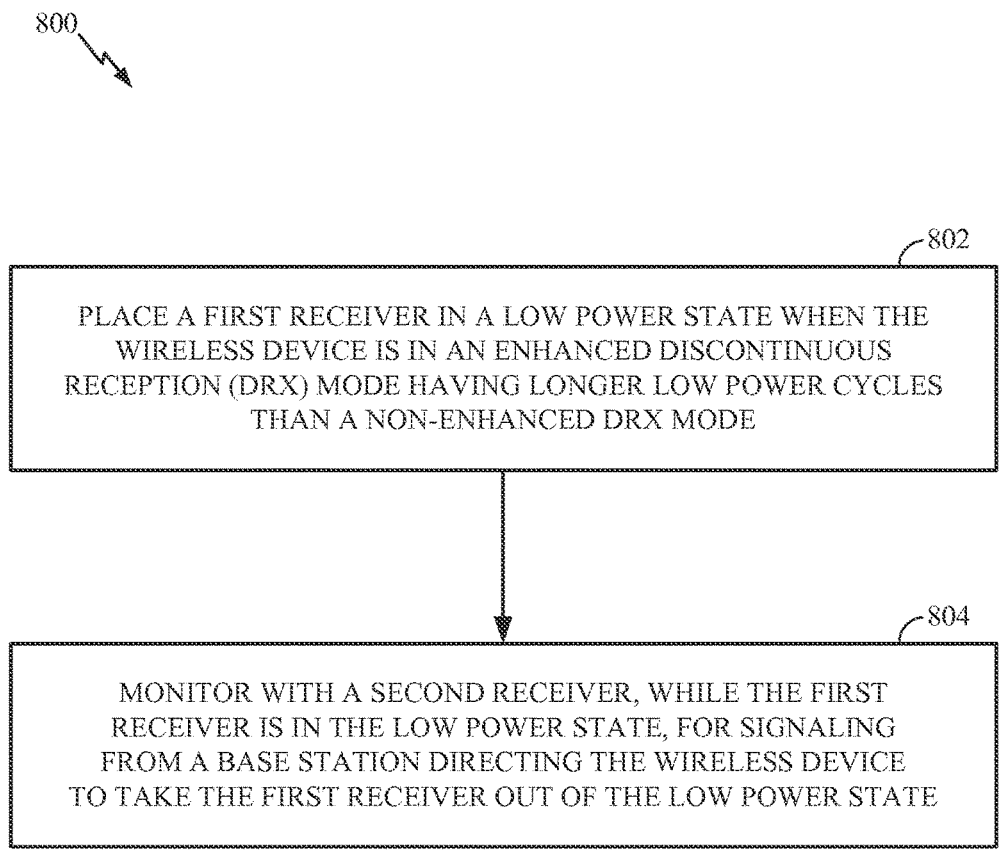
FIG. 8 illustrates exemplary operations that may be performed by a wireless device, in accordance with aspects of the present disclosure.

FIG. 8 illustrates exemplary operations 800 that may be performed for performing low power discontinuous reception (LP-DRX), as described above. Operations 800 may be performed by a UE with two or more receivers, for example. Operations 800 begin at 802, by the UE, for example, placing a first receiver in a low power state (e.g., deactivated or powered down and consuming less than 100 mW of power) when the UE is in an enhanced discontinuous reception (DRX) mode. As noted above, the enhanced DRX mode may comprise operating a UE with longer sleep cycles optimized for delay-tolerant device-terminated applications than are used in current systems. At 804, the UE, for example, may monitor with a second receiver, while the first receiver is in the low power state, for signaling from a base station directing the UE to take the first receiver out of the low power state.

According to aspects of the present disclosure, a wireless device may place a first (e.g., primary) receiver in a low power state in response to a first triggering event. An example of a triggering event is receiving signaling from a base station (BS) directing the wireless device to place the first receiver in the low power state, as described above with reference to FIG. 7. A second example of a triggering event is expiration of a timer (e.g., a DRX ON duration timer or an inactivity timer).

According to aspects of the present disclosure, a wireless device may take a first (e.g., primary) receiver out of a low power state in response to a second triggering event. An example of a triggering event is receiving signaling from a base station (BS) directing the wireless device to take the first receiver out of the low power state, as described above with reference to FIG. 7. A second example of a triggering event is expiration of a timer (e.g., a DRX OFF duration timer).

Figure 9:
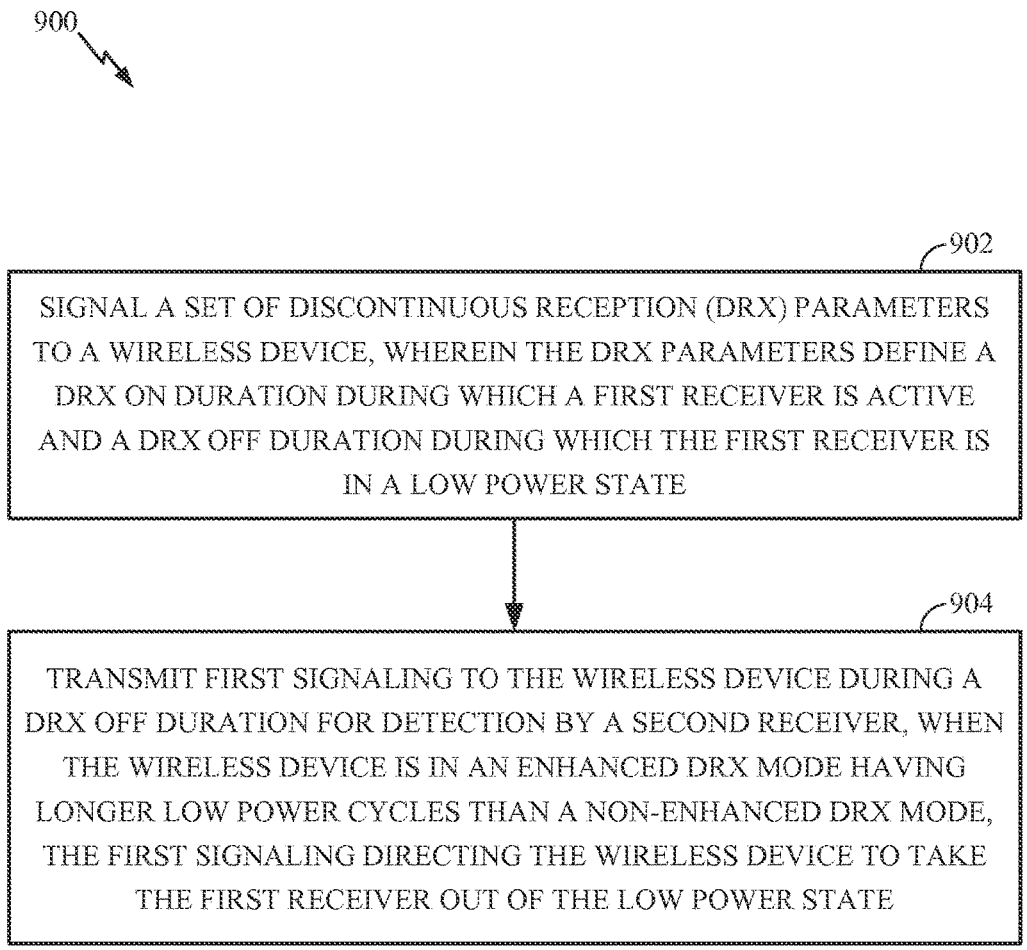
FIG. 9 illustrates exemplary operations that may be performed by a BS, in accordance with aspects of the present disclosure.

FIG. 9 illustrates exemplary operations 900 for performing low power discontinuous reception (LP-DRX), as described above. Operations 900 may be performed by a base station (BS) or eNB, for example. Operations 900 begin at 902, by the BS, for example, signaling a set of discontinuous reception (DRX) parameters to a wireless device, wherein the DRX parameters define a DRX ON duration during which a first receiver is active and a DRX OFF duration during which the first receiver is in a low power state. At 904, the BS, for example, may transmit first signaling (e.g., a page indicator, or a data indicator) to the wireless device during a DRX OFF duration for detection by a second receiver, when the wireless device is in an enhanced DRX mode, the first signaling directing the wireless device to take the first receiver out of the low power state.

According to aspects of the present disclosure, a BS may receive an indication that a wireless device supports an enhanced DRX mode (e.g., the LP-DRX mode described above with respect to FIGS. 7 and 8). The indication may be conveyed via a capabilities message received from the wireless device, for example. Such a capabilities message might be received during a wireless device initial context setup, for example, or might be sent or updated once per RRC connection setup.

According to aspects of the present disclosure, a BS may transmit the first signaling to a wireless device in response to a first triggering event. Examples of such a triggering event include the BS detecting (e.g., receiving from another device) data for the wireless device or expiration of a timer at the BS.

According to aspects of the present disclosure, a BS may transmit second signaling to a wireless device directing the wireless device to place the first receiver in the low power state. The BS may transmit the second signaling in response to a second triggering event. Examples of such triggering events include the BS determining that the BS has no data to transmit to the UE (e.g., the BS has completed transmitting data to the UE) or expiration of a timer at the BS.

According to aspects of the present disclosure, a BS may indicate to a wireless device time and/or frequency resources that may be used for the first signaling. The wireless device may monitor the indicated resources using the secondary receiver of the wireless device while in the enhanced DRX mode. The BS may select the time and/or frequency resources based on information regarding the capabilities of the wireless device (e.g., information received in a capabilities message from the wireless device).

According to aspects of the present disclosure, a BS may receive (e.g., in a capabilities message) information from a wireless device regarding a time period required for the wireless device to activate a primary receiver. The BS may store this information and, when the BS has data to send to the wireless device, the BS may send a page or "wake-up" signal to the wireless device, but delay scheduling other transmissions to the wireless device for at least the period of time required for the wireless device to activate the primary receiver.

According to aspects of the present disclosure, a BS may receive (e.g., in a capabilities message) information from a wireless device regarding inaccuracy (e.g., drift) of a low-power oscillator of a wireless device. A wireless device may use a low-power oscillator as a clock while a primary receiver is inactive. The wireless device may have a measure of the inaccuracy or drift of the oscillator, and may provide the measure to a serving BS. The serving BS may utilize information regarding the inaccuracy of the low-power oscillator of a wireless device in determining when to send a paging or "wake-up" signal to the wireless device. The serving BS may determine to send multiple paging or "wake-up" signals to a wireless device, based on information regarding the inaccuracy of a low-power oscillator of the wireless device.

According to aspects of the present disclosure, a BS may transmit a time indication signal to be received by wireless devices using LP-DRX. The time indication signal may be transmitted using frequencies and/or modulation techniques that secondary receivers of wireless devices are designed to receive. The time indication signal may be received by wireless devices operating with LP-DRX to correct clock drift of the wireless devices, improving reliability of the reception of paging or "wake-up" signals by the wireless devices. A serving BS may schedule transmission of paging or "wake-up" signals based on transmission of the time indication signals, with the BS scheduling the paging or "wake-up" signals to occur shortly after the time indication signals, as sending a paging signal to a wireless device shortly after the wireless device is time synchronized with the BS may improve reliability of the reception of the paging signal by the wireless device.

Figure 10:
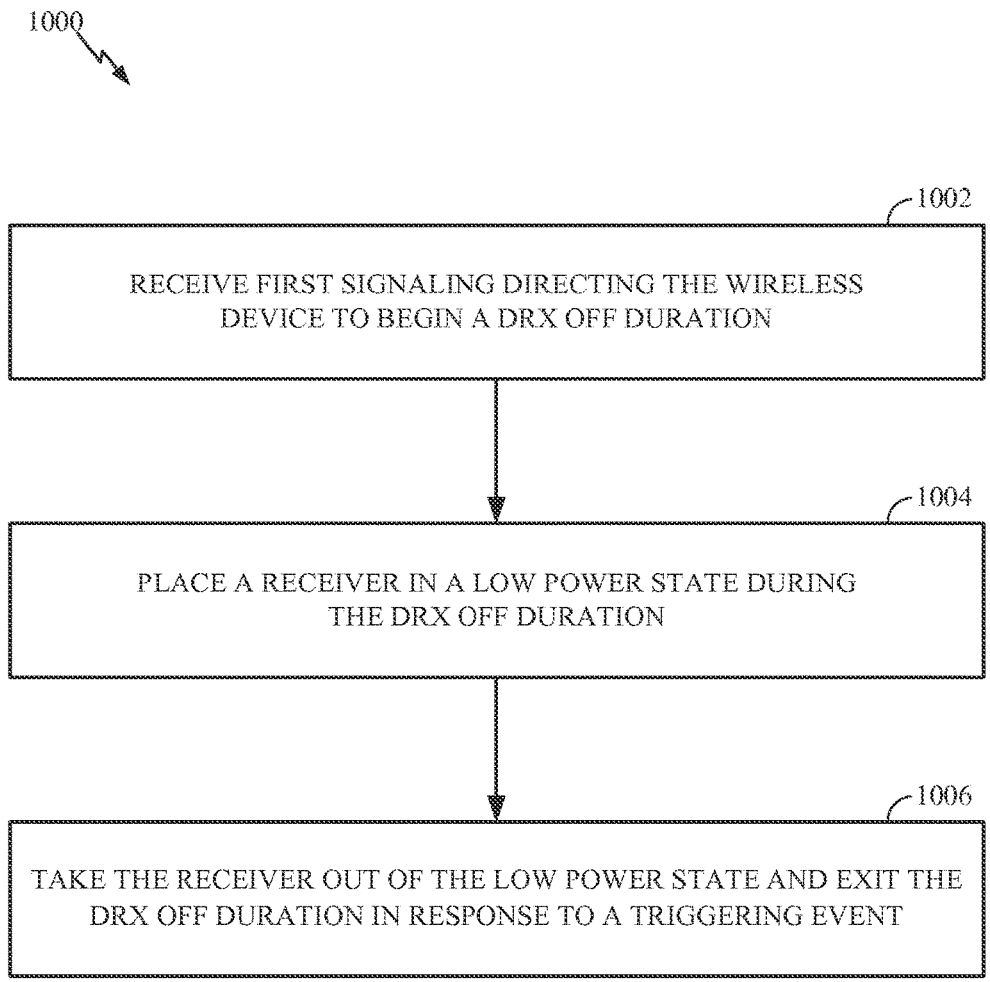
FIG. 10 illustrates exemplary operations that may be performed by a wireless device, in accordance with aspects of the present disclosure.

FIG. 10 illustrates exemplary operations 1000 that may be performed for performing low power discontinuous reception (LP-DRX), as described above. Operations 1000 may be performed by a wireless device (e.g., a UE), for example. Operations 1000 begin at 1002, by the wireless device, for example, receiving first signaling, directing the wireless device to begin a DRX OFF duration. At 1004, the wireless device, for example, may place a receiver in a low power (e.g., deactivated or powered down) state during the DRX OFF duration. At 1006, the wireless device may, for example, take the receiver out of the low power state and exit the DRX OFF duration in response to a triggering event (e.g., expiration of a DRX OFF duration timer).

According to aspects of the present disclosure, the first signaling may be received within a configured DRX ON duration. For example, a wireless device may be operating with a receiver in an active state and receive signaling directing the wireless device to begin a DRX OFF duration. In the example, the wireless device may place the receiver in a low power state without waiting for expiration of the DRX ON duration timer or expiration of an inactivity timer.

As mentioned above, a signal indicating that a wireless device operating in enhanced DRX or LP-DRX mode should activate a primary receiver may be transmitted via a dedicated waveform that the primary receiver is not designed to demodulate. In a system using such a dedicated waveform, the wireless device and a serving BS of the wireless device should be coordinated to ensure the wireless device does not put the primary receiver in a low power state when the BS is expecting the primary receiver of the wireless device to be active.

According to aspects of the present disclosure, a wireless device and a serving BS may exchange messages to coordinate use of LP-DRX by the wireless device. In one aspect, a wireless device may transmit a request to begin using LP-DRX to a serving BS of the wireless device, and the BS may accept or decline the request in a response message. In a response message accepting the request, a serving BS may include parameters (e.g., LP-DRX ON duration, LP-DRX cycle length, time and/or frequency resources to be monitored by the UE for paging or "wake-up" signaling from the BS) to be used by the wireless device in performing LP-DRX. Alternatively, a serving BS may send a separate message conveying LP-DRX parameters to the wireless device. In a response message declining the request, a serving BS may indicate to the wireless device a time period to wait before making another LP-DRX request and/or a command to enter a standard DRX cycle (e.g., with the wireless device activating and deactivating the wireless device's primary receiver), including parameters for the standard DRX cycle.

In another aspect of the present disclosure, a serving BS may transmit a request for a wireless device to begin using LP-DRX. The request message may include LP-DRX parameters (e.g., LP-DRX ON duration, LP-DRX cycle length, time and/or frequency resources to be monitored by the wireless device for paging or "wake-up" signaling from the BS) to be used by the wireless device in performing LP-DRX, or a serving BS may send LP-DRX parameters to a wireless device after receiving an acceptance of the request from the wireless device. In this aspect, the wireless device may be required to start using LP-DRX and send an acceptance message to the BS, or, alternatively, the wireless device may be allowed to refuse the request and send an acceptance or decline message, based on whether the wireless device accepted or declined the request.

According to aspects of the present disclosure, a wireless device may send a signal indicating to the serving base station (e.g., an eNB) of the wireless device that the wireless device supports LP-DRX operations. For example, a wireless device may send a capability message indicating that the wireless device supports LP-DRX operations to the serving base station of the wireless device during an initial wireless device context setup. The wireless device may also send the capability message at each RRC connection setup. The capability message may indicate frequencies (e.g., frequency bands, carrier frequencies), modulation techniques (e.g., on-off keying, ASK, FSK), and/or other information regarding the wireless device's capability to monitor for signaling while the wireless device's primary receiver is in a low power state. The capability message may also indicate a time period required for the wireless device to activate a primary receiver and/or a measure of the accuracy of a low-power (e.g., consuming less than one mW) oscillator (e.g., accuracy of an internal clock) of the wireless device.

According to aspects of the present disclosure, and as mentioned above, a signal indicating that a wireless device operating in enhanced DRX or LP-DRX mode should activate the primary receiver of the wireless device may be transmitted (e.g., by a serving BS) via a waveform that the primary receiver is designed to demodulate (e.g., an OFDM waveform). In a system using such a waveform, the wireless device and the serving BS of the wireless device may not be required to coordinate use of enhanced DRX or LP-DRX mode by the wireless device. The coordination may not be necessary because the wireless device can receive a signal indicating the BS has data for the wireless device with either the primary or the secondary receiver. Because the wireless device and the serving BS are not required to coordinate the use of enhanced DRX or LP-DRX mode by the wireless device, the wireless device may determine which receiver to use without affecting operations of the serving BS.

According to aspects of the present disclosure, a wireless device with two receivers may determine which receiver to use based on sensitivity of the first or second receivers or a current coverage condition of the wireless device. For example, if a low-power or secondary receiver of a wireless device has poorer sensitivity than a primary receiver of the wireless device, if the wireless device is in poor coverage from the serving BS of the wireless device, and/or if there are other RF interference that impairs the secondary receiver's performance, the wireless device may determine to use the primary (e.g., full-power) receiver only.

According to aspects of the present disclosure, a wireless device with two receivers may determine which receiver to use based on a need to save power by the wireless device, latency needs of one or more applications, or traffic pattern learning. For example, if the wireless device determines that the traffic pattern is such that for each DRX cycle the full-power receiver is extremely likely to be woken up (e.g., to receive data in each DRX cycle), the wireless device may determine to use the full-power receiver only.

Figure 11:
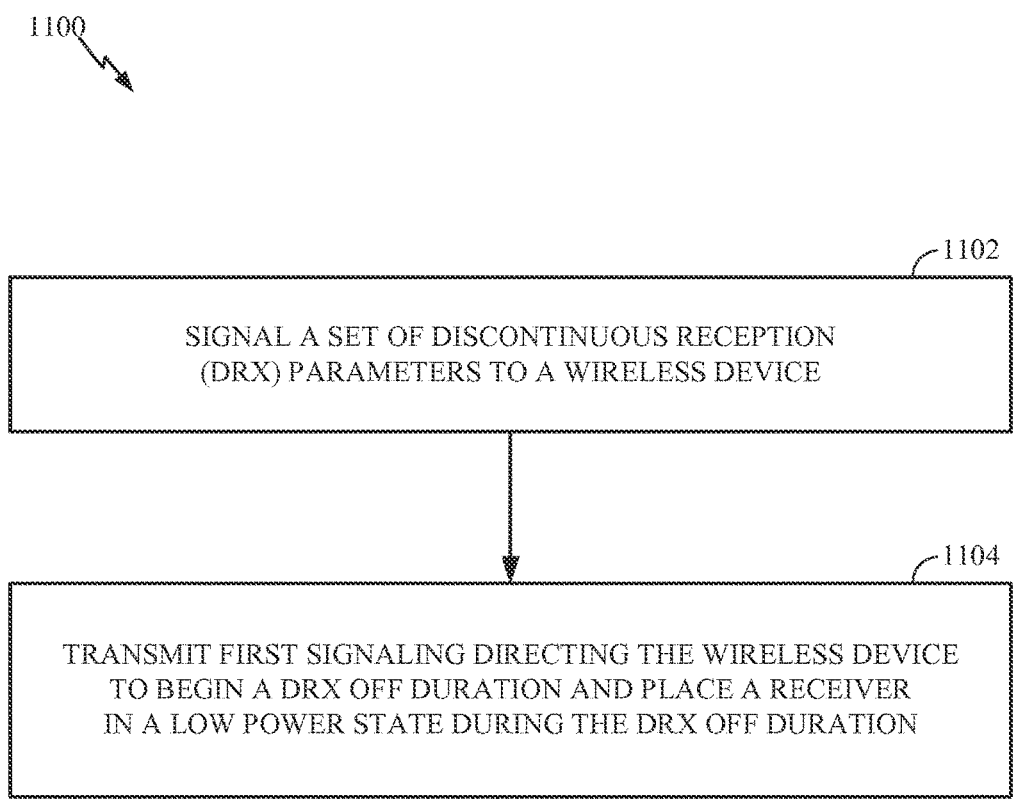
FIG. 11 illustrates exemplary operations that may be performed by a BS, in accordance with aspects of the present disclosure.

FIG. 11 illustrates exemplary operations 1100 for performing low power discontinuous reception (LP-DRX), as described above. Operations 1100 may be performed by a base station (BS) or eNB, for example. Operations 1100 begin at 1102, by the BS, for example, signaling a set of discontinuous reception (DRX) parameters to a wireless device. At 1104, the BS, for example, may transmit first signaling directing the wireless device to begin a DRX OFF duration and place a receiver in a low power state during the DRX OFF duration.

According to aspects of the present disclosure, a BS may transmit the first signaling during a configured DRX ON duration. For example, a wireless device may be operating with a receiver in an active state and a BS may transmit first signaling directing the wireless device to begin a DRX OFF duration. In the example, the wireless device may place the receiver in a low power state without waiting for expiration of the DRX ON duration timer or expiration of an inactivity timer.

Figure 12:
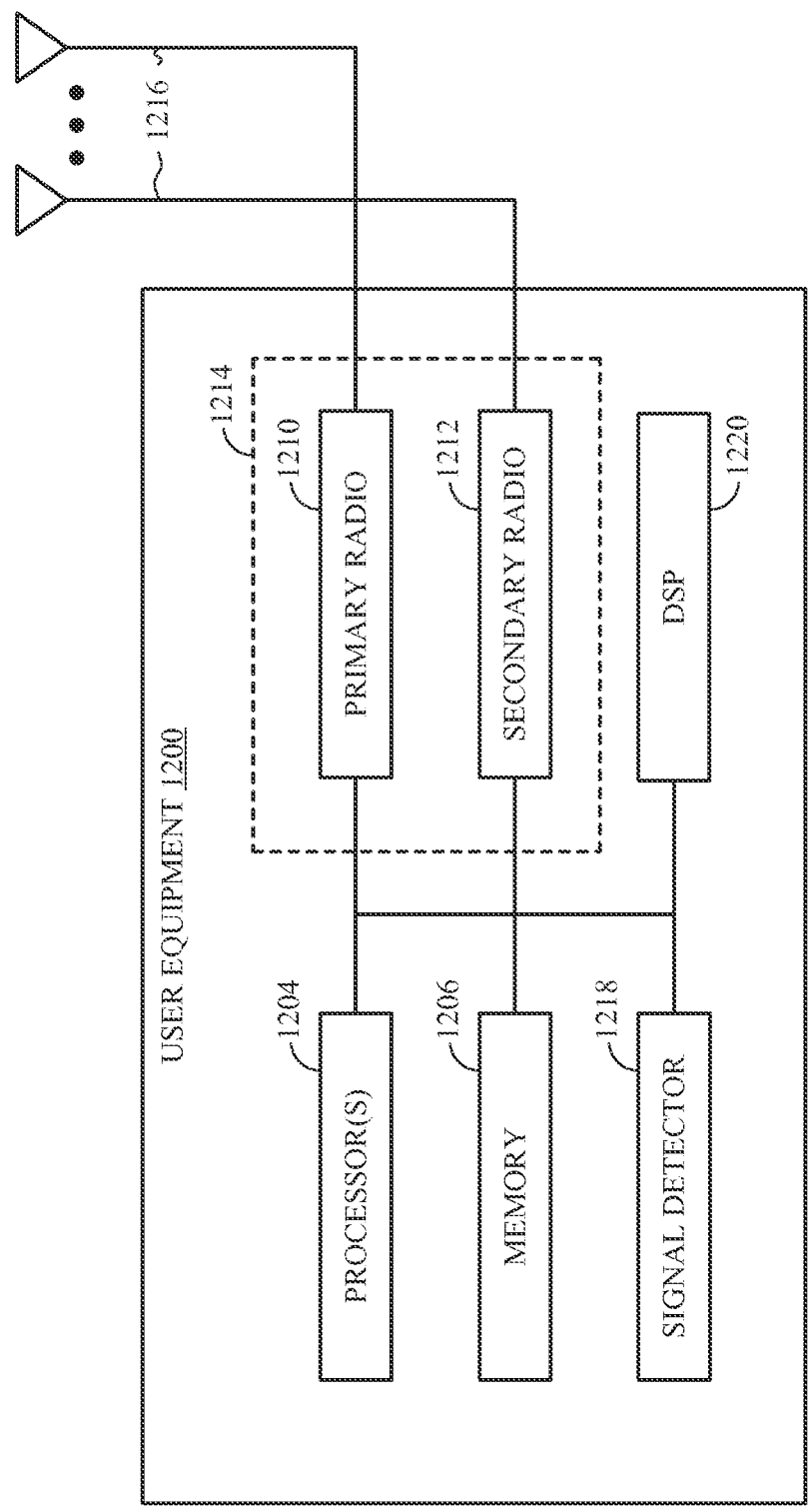
FIG. 12 illustrates exemplary components of a wireless device, according to aspects of the present disclosure.

FIG. 12 illustrates various components that may be utilized in a wireless device 1200 having a primary receiver and a secondary receiver and capable of operating in accordance with aspects provided herein. The wireless device 1200 may, for example, be one implementation of UE 110 shown in FIG. 1.

The wireless device 1200 may include one or more processors 1204 which control operation of the wireless device 1200. The processors 1204 may also be referred to as central processing units (CPUs). The processors 1204 may perform or direct the performance of the methods described herein (e.g., the methods described above with reference to FIGS. 8 and 10). Memory 1206, which may include both read-only memory (ROM) and random access memory (RAM), provides instructions and data to the processors 1204. A portion of the memory 1206 may also include non-volatile random access memory (NVRAM). The processors 1204 typically perform logical and arithmetic operations based on program instructions stored within the memory 1206. The instructions in the memory 1206 may be executable to implement the methods described herein (e.g., the methods described above with reference to FIGS. 8 and 10).

The wireless device 1200 may also include radios 1210 and 1212. One radio may include a primary receiver, while the other radio may include a secondary receiver. Each radio may, for example, include a transmitter and receiver, and any other "RF chain" components to allow transmission and reception of data between the wireless device 1200 and a BS. While two radios are shown, as an example only, more than two radios may be included (e.g., to support more than two RATs). Each radio may communicate via a single or a plurality of antennas 1216.

The wireless device 1200 may also include a signal detector 1218 that may be used in an effort to detect and quantify the level of signals received by the transceiver 1214. The signal detector 1218 may detect such signals as total energy, energy per subcarrier per symbol, power spectral density and other signals. The wireless device 1200 may also include a digital signal processor (DSP) 1220 for use in processing signals.

Figure 13:
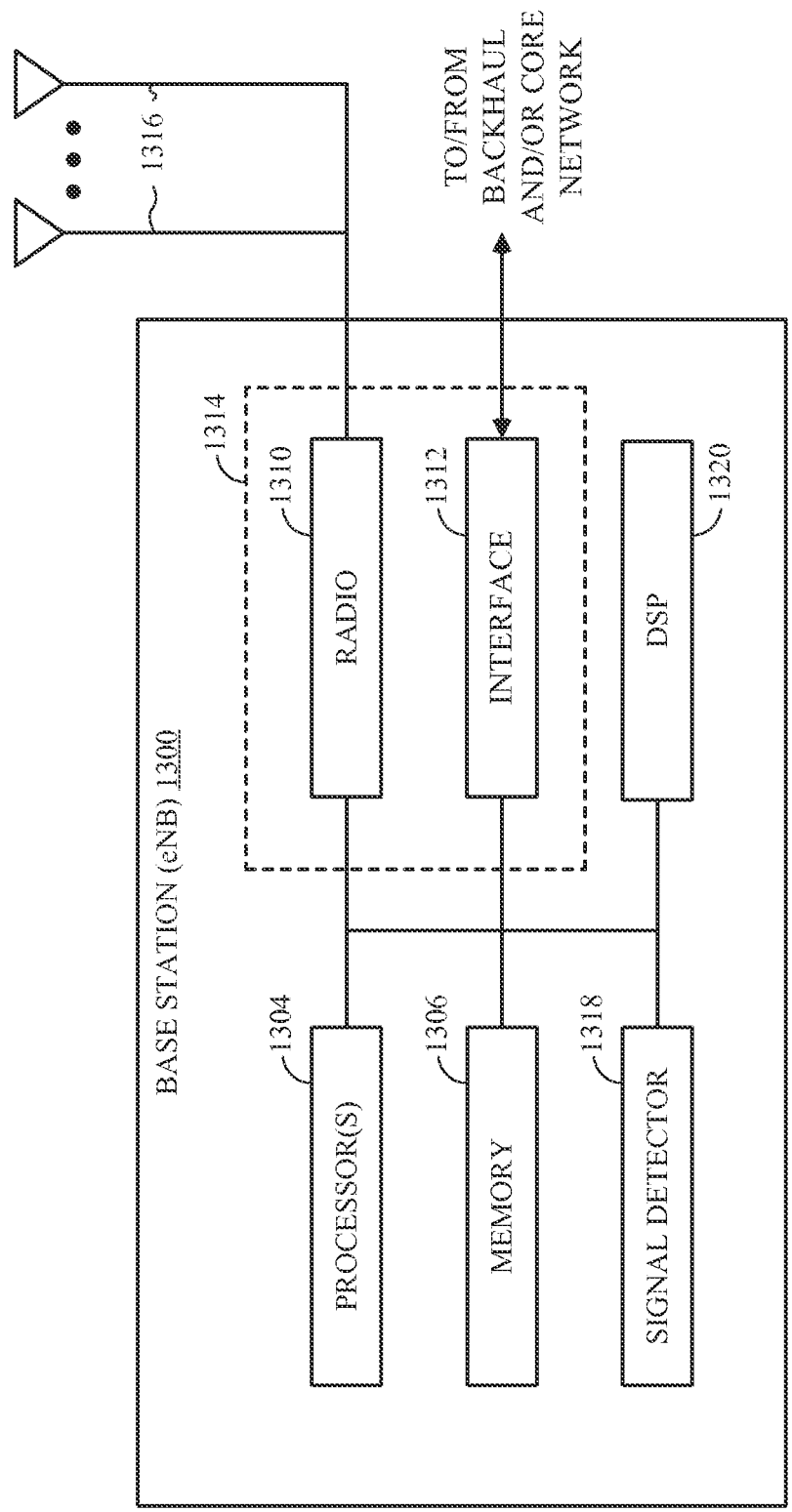
FIG. 13 illustrates exemplary components of a base station, according to aspects of the present disclosure.

FIG. 13 illustrates various components that may be utilized in a base station 1300 capable of participating in communication with a wireless device having a primary receiver and a secondary receiver, according to aspects of the present disclosure. The base station 1300 may, for example, be one implementation of eNB 122 or base station 132 shown in FIG. 1.

The base station 1300 may include one or more processors 1304 which control operation of the base station 1300. The processors 1304 may also be referred to as central processing units (CPUs). The processors 1304 may perform or direct the performance of the methods described herein (e.g., the methods described above with reference to FIGS. 9 and 11). Memory 1306, which may include both read-only memory (ROM) and random access memory (RAM), provides instructions and data to the processors 1304. A portion of the memory 1306 may also include non-volatile random access memory (NVRAM). The processors 1304 typically perform logical and arithmetic operations based on program instructions stored within the memory 1306. The instructions in the memory 1306 may be executable to implement the methods described herein (e.g., the methods described above with reference to FIGS. 9 and 11).

The base station 1300 may also include one or more radios 1310, for example to communicate with a UE via one or more RATs. Each radio may, for example, include a transmitter and receiver, and any other "RF chain" components to allow transmission and reception of data between the base station 1300 and different UEs. Each radio may communicate via a single or a plurality of antennas 1316. The base station 1300 may also include an interface 1312 for communicating with other base stations (e.g., via an X2 backhaul connection) or a core network (e.g., via an S1 connection).

The base station 1300 may also include a signal detector 1318 that may be used in an effort to detect and quantify the level of signals received by the transceiver 1314. The signal detector 1318 may detect such signals as total energy, energy per subcarrier per symbol, power spectral density and other signals. The base station 1300 may also include a digital signal processor (DSP) 1320 for use in processing signals.

Figure 14:
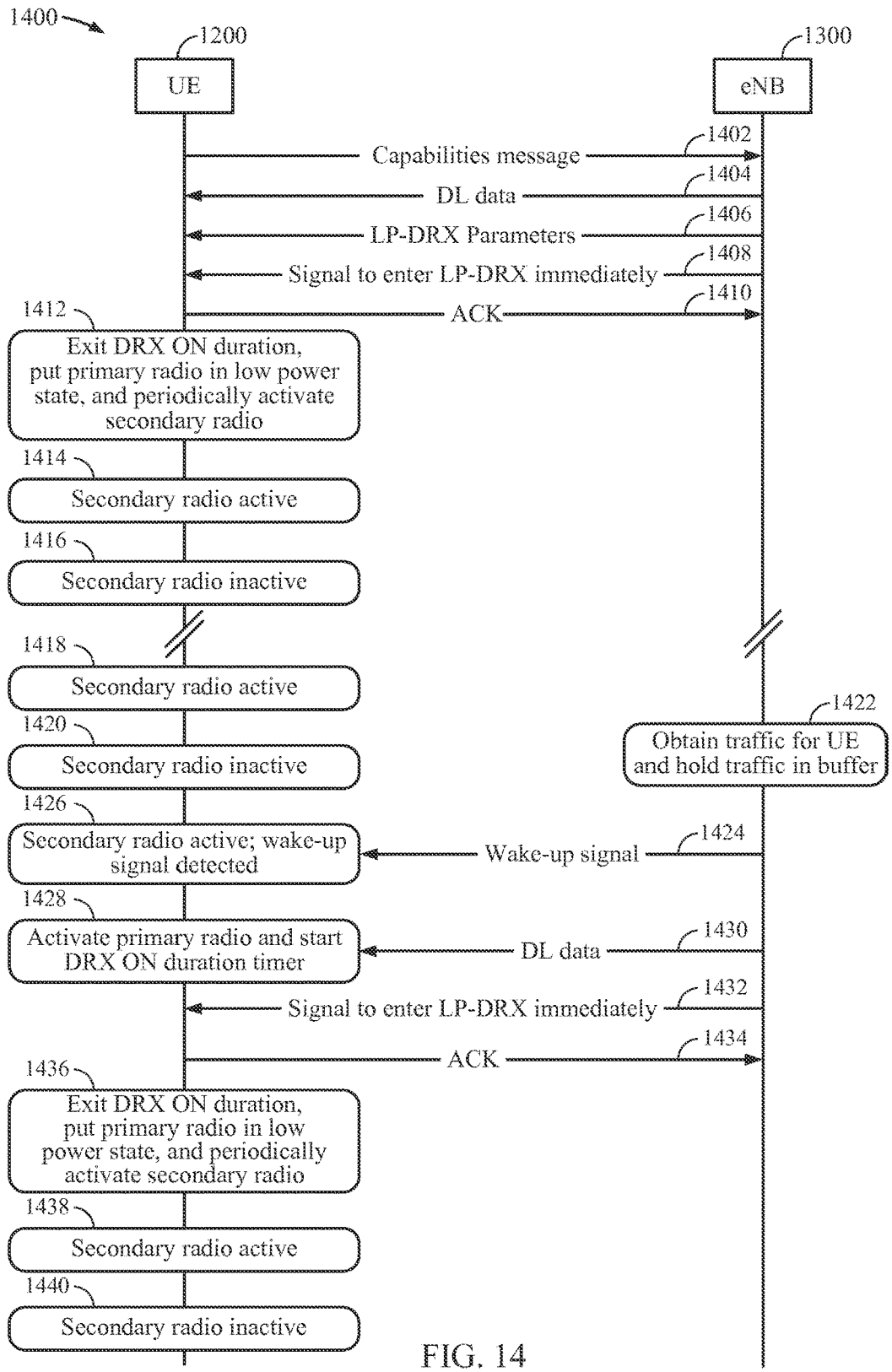
FIG. 14 illustrates an exemplary call flow of a wireless device and a base station, according to aspects of the present disclosure.

FIG. 14 illustrates an exemplary call flow 1400 between a UE 1200 performing LP-DRX and an eNB 1300 serving the UE, according to aspects of the present disclosure. The call flow begins at 1402 with the UE sending a capabilities message to the eNB indicating that the UE is capable of performing LP-DRX. As described above, the capabilities message may include, for example, information regarding frequency bands that the UE's secondary receiver can receive, modulation techniques that the UE's secondary can demodulate, and a time period needed for the UE to activate the primary receiver of the UE. The eNB stores the capabilities information received from the UE. At 1404, the eNB may transmit downlink data to the UE. At 1406, the eNB transmits a set of LP-DRX parameters to the UE. Transmission of the LP-DRX parameters may occur before, after, or in-between data transmissions to the UE. At 1408, the eNB has completed data transmissions to the UE and signals the UE to enter LP-DRX immediately. At 1410, the UE acknowledges (ACK) the command to enter LP-DRX. After acknowledging the command from the eNB, the UE exits any DRX ON duration (that is, terminates a DRX ON duration timer), puts the primary radio (e.g., primary receiver) in a low power state, and begins periodically activating a secondary radio (e.g., secondary receiver) of the UE. The UE activates the secondary radio at 1414, 1418, and other times not shown. The UE deactivates the secondary radio at 1416, 1420, etc.

At 1422, the eNB obtains traffic (e.g., data) for delivery to the UE. The eNB holds the traffic in a buffer while awaiting an opportunity to deliver the traffic. At 1424, the eNB determines, based on information about the LP-DRX cycle of the UE (e.g., time the LP-DRX cycle started, LP-DRX cycle length, LP-DRX ON duration) stored by the eNB, that the secondary radio of the UE may be active, and transmits a "wake-up" signal to be received by the secondary radio of the UE. At 1426, the UE has activated the UE's secondary radio and detects the "wake-up" signal transmitted by the eNB at 1424. The UE begins activating the UE's primary radio in response to detecting the "wake-up signal". At 1428, the UE has completed activation of the UE's primary radio and may start a DRX ON duration timer.

The eNB has information regarding the time period needed for the UE to activate the UE's primary receiver, and delays scheduling transmissions for the UE's primary radio for at least that period of time after transmitting the "wake-up" signal at 1424. At 1430, the eNB determines that the time period has passed and transmits the traffic to the UE. At 1432, the eNB has completed the data transmission to the UE and signals the UE to enter LP-DRX early. As before, at 1434 the UE acknowledges the command, and at 1436 the UE exits any DRX ON duration (that is, terminates a DRX ON duration timer), puts the primary radio (e.g., primary receiver) in a low power state, and begins periodically activating a secondary radio (e.g., secondary receiver) of the UE. The UE activates the secondary radio at 1438, etc. and UE deactivates the secondary radio at 1440, etc.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications performed by a wireless device, comprising:
   transmitting to a base station (BS) an indication that the wireless device supports an enhanced discontinuous reception (DRX) mode of a first radio access technology (RAT), the enhanced DRX mode having longer low power cycles than a non-enhanced DRX mode;
   determining a receiver, from a plurality of receivers, to place in a low power state when the wireless device is in the enhanced DRX mode;
   placing the determined receiver in the low power state when the wireless device is in the enhanced DRX mode after transmitting to the BS the indication that the wireless device supports the enhanced DRX mode; and
   monitoring, in accordance with the enhanced DRX mode, with another receiver from the plurality of receivers, while the determined receiver is in the low power state, for signaling via the first RAT from the BS directing the wireless device to take the determined receiver out of the low power state.

2. The method of claim 1, wherein:
   the signaling comprises a page indicator; and
   the determined receiver receives a page message after the wireless device takes the determined receiver out of the low power state.

3. The method of claim 1, wherein:
   the signaling comprises a data indicator; and
   the determined receiver receives a data packet after the wireless device takes the determined receiver out of the low power state.

4. The method of claim 1, wherein:
   the other receiver comprises a lower-power receiver than the determined receiver.

5. The method of claim 1, wherein the determination is based on at least one of: a current coverage condition of the wireless device, a current battery power level of the wireless device, or traffic pattern learning.

6. The method of claim 1, further comprising:
   transmitting a request to the BS for the wireless device to enter the enhanced DRX mode; and
   receiving a response from the BS acknowledging that the BS has accepted the request.

7. The method of claim 1, further comprising:
   receiving a request from the BS for the wireless device to enter the enhanced DRX mode; and
   transmitting a response to the BS acknowledging that the wireless device has accepted the request.

8. A method for wireless communications performed by a base station (BS), comprising:
   receiving, from a wireless device, an indication that the wireless device supports an enhanced discontinuous reception (DRX) mode of a first radio access technology (RAT), the enhanced DRX mode having longer low power cycles than a non-enhanced DRX mode;
   signaling, after receiving the indication that the wireless device supports the enhanced DRX mode, a set of DRX parameters to the wireless device that define a DRX ON duration during which a first receiver of a plurality of receivers of the wireless device is active and a DRX OFF duration during which the first receiver is in a low power state; and
   transmitting signaling via the first RAT, in accordance with the enhanced DRX mode, to the wireless device during the DRX OFF duration for detection by a second receiver, when the wireless device is in the enhanced DRX mode, the signaling directing the wireless device to take the first receiver out of the low power state.

9. The method of claim 8, wherein:
   the signaling comprises a page indicator; and
   the BS transmits a page message after the wireless device takes the first receiver out of the low power state.

10. The method of claim 8, wherein:
    the signaling comprises a data indicator; and
    the BS transmits a data packet after the wireless device takes the first receiver out of the low power state.

11. The method of claim 8, wherein transmitting the signaling comprises:
    transmitting the signaling during only a portion of the DRX OFF duration, based on a determined duty cycle.

12. The method of claim 8, further comprising:
    transmitting a request to the wireless device for the wireless device to enter the enhanced DRX mode; and
    receiving a response from the wireless device acknowledging that the wireless device has accepted the request.

13. The method of claim 8, further comprising:
    receiving a request from the wireless device for the wireless device to enter the enhanced DRX mode; and
    transmitting a response to the wireless device acknowledging that the BS has accepted the request.

14. An apparatus for wireless communications, comprising:
    a processor configured to:
      transmit to a base station (BS) an indication that the apparatus supports an enhanced discontinuous reception (DRX) mode of a first radio access technology (RAT), the enhanced DRX mode having longer low power cycles than a non-enhanced DRX mode;
      determine which receiver, from a plurality of receivers of the apparatus, to place in a low power state when the wireless device is in the enhanced DRX mode;
      place the determined receiver of the apparatus in the low power state when the apparatus is in the enhanced DRX mode after transmitting to the BS the indication that the wireless device supports the enhanced DRX mode; and
      monitor, in accordance with the enhanced DRX mode, with another receiver from the plurality of receivers of the apparatus, while the determined receiver is in the low power state, for signaling via the first RAT from the base station (BS) directing the apparatus to take the determined receiver out of the low power state; and
    a memory coupled with the processor.

15. The apparatus of claim 14, wherein:
the signaling comprises a page indicator; and
the processor is further configured to receive a page message with the determined receiver after the apparatus takes the determined receiver out of the low power state.

16. The apparatus of claim 14, wherein:
the signaling comprises a data indicator; and
the processor is further configured to receive a data packet with the determined receiver after the apparatus takes the determined receiver out of the low power state.

17. The apparatus of claim 14, wherein the determination is based on at least one of: a current coverage condition of the apparatus, a current battery power level of the apparatus, or traffic pattern learning.

18. An apparatus for wireless communications, comprising:
a processor configured to:
receive, from a wireless device, an indication that the wireless device supports an enhanced discontinuous reception (DRX) mode of a first radio access technology (RAT), the enhanced DRX mode having longer low power cycles than a non-enhanced DRX mode;
signal a set of discontinuous reception (DRX) parameters to a wireless device that define a DRX ON duration during which a first receiver of a plurality of receivers of the wireless device is active and a DRX OFF duration during which the first receiver is in a low power state; and
transmit signaling via the first RAT, in accordance with the first enhanced DRX mode, to the wireless device during the DRX OFF duration for detection by a second receiver of the wireless device, when the wireless device is in the enhanced DRX mode, the signaling directing the wireless device to take the first receiver out of the low power state; and
a memory coupled with the processor.

19. The apparatus of claim 18, wherein:
the signaling comprises a page indicator; and
the processor is further configured to transmit a page message to the wireless device after transmitting the signaling.

20. The apparatus of claim 18, wherein:
the signaling comprises a data indicator; and
the processor is further configured to transmit a data packet to the wireless device after transmitting the signaling.

21. The apparatus of claim 18, wherein the processor is further configured to:
transmit the signaling during only a portion of the DRX OFF duration, based on a determined duty cycle.

* * * * *